United States Patent [19]

Lovaas

[11] Patent Number: 4,783,112
[45] Date of Patent: Nov. 8, 1988

[54] PICKUP TRUCK BED COVER

[76] Inventor: Olaf K. Lovaas, 90 Highland Ave. #424, Tarpon Springs, Fla. 34689

[21] Appl. No.: 130,094

[22] Filed: Dec. 7, 1987

[51] Int. Cl.$^4$ .............................................. B60P 7/02
[52] U.S. Cl. ................................... 296/100; 296/57.1
[58] Field of Search .................... 296/100, 101, 57 R

[56] References Cited

U.S. PATENT DOCUMENTS

| | | |
|---|---|---|
| 3,165,352 | 1/1965 | Hallock et al. ................... 296/100 |
| 3,342,523 | 9/1967 | Lutgen ............................... 296/100 |
| 3,578,378 | 5/1971 | Anderson ........................... 296/100 |
| 3,640,565 | 2/1972 | Anderson ........................... 296/100 |
| 3,649,072 | 3/1972 | Cross ................................. 296/100 |
| 4,068,886 | 1/1978 | Gostomski ......................... 296/100 |
| 4,273,377 | 6/1981 | Alexander ..................... 296/219 X |
| 4,518,194 | 5/1985 | Kirkham ....................... 160/84.1 X |

Primary Examiner—Dennis H. Pedder
Attorney, Agent, or Firm—A. W. Fisher, III

[57] ABSTRACT

A pickup truck bed cover to selectively enclose the bed of a pickup truck comprising a first and second closure panel slidably mounted between a pair of substantially parallel side panel tracks affixed to opposite side walls of the bed of the pickup truck, each of the pair of substantially parallel side panel tracks includes an intermediate and a lower track member to operatively support opposite longitudinal peripheral edges of the second and first closure panels respectively, a rear panel track affixed to the tailgate of the pickup truck includes an intermediate track member to operatively support the rear lateral peripheral edge of the second closure panel, a front panel track affixed to the forward portion of the bed of the pickup truck includes a lower track member to operatively support the front peripheral lateral edge of the first closure panel, a closure panel locking device to selectively lock the first and second closure panels relative to each other and a panel securing device to selectively secure the rear panel track and tailgate to one side wall of the bed of the pickup truck.

20 Claims, 2 Drawing Sheets

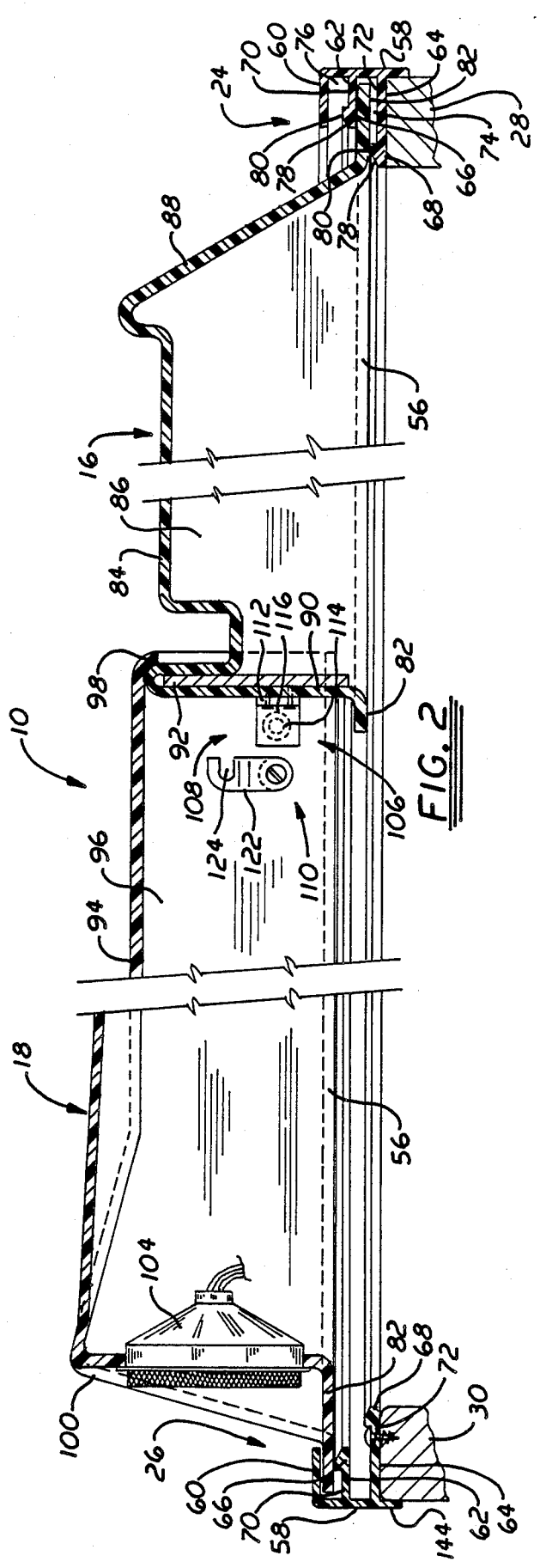

PICKUP TRUCK BED COVER

BACKGROUND OF THE INVENTION

1. Field of the Invention

A pickup truck bed cover to selectively enclose the bed of a pickup truck.

2. Description of the Prior Art

The rear portion of pickup trucks normally carry loads exposed to the weather. To protect such loads the truck bed is often covered with tarpaulin or canvas. However, these tend to collect water thay may seep through the covering. Moreover, these covers are not secure from theft or vandalism.

U.S. Pat. No. 3,649,072 discloses a telescopic cover for the bed of pickup trucks, comprising a pair of parallel tracks to retain opposite edges of a plurality of transversely extending interlocking panels that are movable forward longitudinally from an essentially planar cover forming relation into a stacked relation.

U.S. Pat. No. 4,518,194 shows a cover for a pickup truck. A track is supported from the top of the side panels of the truck bed formed by a pair of parallel rails each having a longitudinal elongated slot. The front end of each rail extends partially into a transversely disposed storage box fitted down into the truck bed. A sheet of flexible material is fitted over a rectangular frame to enclose the truck bed.

U.S. Pat. No. 3,640,565 discloses a cover assembly for open bed vehicles comprising a plurality of cover segments at least one of which is movable relative to another. The movable segment carries wheel assemblies engageable with a pair of guide rails along which the segment is movable. Means are included for selectively elevating and lowering the movable segment during movement between extended and retracted positions. Detents are provided in which portions of the wheel assemblies are engageable for maintaining the movable cover segment in predetermined locations. Improved latch means also are provided for holding open a pivotal gate closure mounted at one end of the cover assembly.

U.S. Pat. No. 3,342,523 shows a retractable cover apparatus including a plurality of cover sections each comprising a rigid top wall and depending side walls.

U.S. Pat. No. 4,273,377 discloses a tonneau cover for pickup trucks including an elongated track secured to the sides of the having ribs extending across the bed of the truck and secured to bearing guides movable on track. An impervious tonneau cover secured to the ribs is movable therewith to cover the bed of the truck.

U.S. Pat. No. 4,068,886 shows a telescoping cover assembly for the open bed of a vehicle comprising front and rear cover sections movable relative to each other to permit selective access to the vehicle bed without the burden of removing the cover. The front and rear cover sections are lockable to insure safety and security.

U.S. Pat. No. 3,165,352 discloses an adjustable roof extending longitudinally on an automotive vehicle comprising parallel tracks having a plurality of telescopic sections mounted thereon. Each of the tracks mounted on the body of the vehicle include a plurality of laterally extending grooves to accommodate the terminal portion of the side walls of the sections to permit longitudinal sliding of the sections. The grooves include drainage means.

SUMMARY OF THE INVENTION

The present invention relates to a pickup truck bed cover to selectively enclose the bed of a pickup truck.

The pickup truck bed cover comprises a first and second closure panel slidably mounted between a pair of side panel tracks affixed to opposite side walls of the pickup truck. The pickup truck bed cover further includes a front and rear panel track affixed to the forward portion of the bed and tailgate respectively.

The pick up truck bed cover further includes a closure panel locking device to selectively lock the first and second closure panels relative to each other. The closure panel locking device comprises a first and second lock member. The first lock member is affixed to the rear wall of the first closure panel. The second lock member includes a lock element including a lock slot formed on one end portion thereof rotatably mounted on the forward portion of one side wall of the second closure panel.

The pick up truck bed cover may also includes a securing device to selectively secure the rear panel track and tailgate to one side wall of the bed of the pick up truck. When the first and second panels are in the locked position relative to each other or to limit the reaward movement of the first and second panels when in the unlocked position relative to each other.

In use, the tailgate is opened to permit the first and second closure panels to be slid into the side panel tracks and moved forward along the bed of the pickup truck. The first closure panel is moved forward until the forward most portion thereof is disposed within the front panel track.

With the first and second closure panels in the retracted position the rear most portion of the second closure panel will engage the securing device to limit the rearward movement thereof.

To secure the tailgate to the bed of the pickup truck a portion of the securing device is placed through the tailgate and one side wall of the pickup truck. The second closure panel is then moved rearwardly until the rear most portion thereof is disposed within the rear panel track. The lock element of the second lock member is rotated such that the lock slot engages the first lock member to lock the first and second closure panels in the extended position.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIG. 2 is a cross-sectional side view of the pickup truck bed cover and pickup truck taken along line 2—2 of FIG. 1.

FIG. 7 is a detail view of the panel locking device.

Similar reference characters refer to similar parts throughout the several views of the drawings.

DETAILED DESCRIPTION OF THE PREFERRED EMBODIMENT

Figure 1:
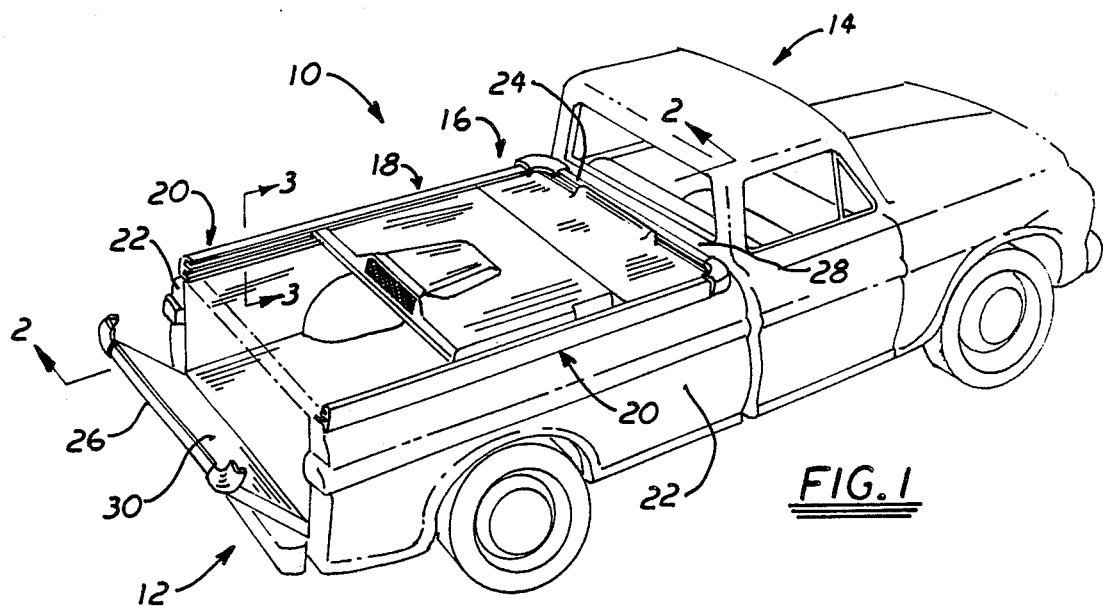
FIG. 1 is an isometric view of the pickup truck bed cover and pickup truck.

As shown in FIG. 1 the present invention relates to a pickup truck bed cover generally indicated as 10 to selectively enclose the bed 12 of a pickup truck 14.

As best shown in FIGS. 1 and 2, the pickup truck bed cover 10 comprises a first and second closure panel generally indicated as 16 and 18 respectively slidably mounted between a pair of substantially parallel side panel tracks each generally indicated as 20 affixed to opposite side walls each indicated as 22 of the bed 12 of the pickup truck 14. As shown in FIGS. 1 and 2, the pickup truck bed cover 10 further includes a front and rear panel track generally indicated as 24 and 26 respectively affixed to the forward portion 28 of the bed 12 and tailgate 30 respectively.

Figure 3:
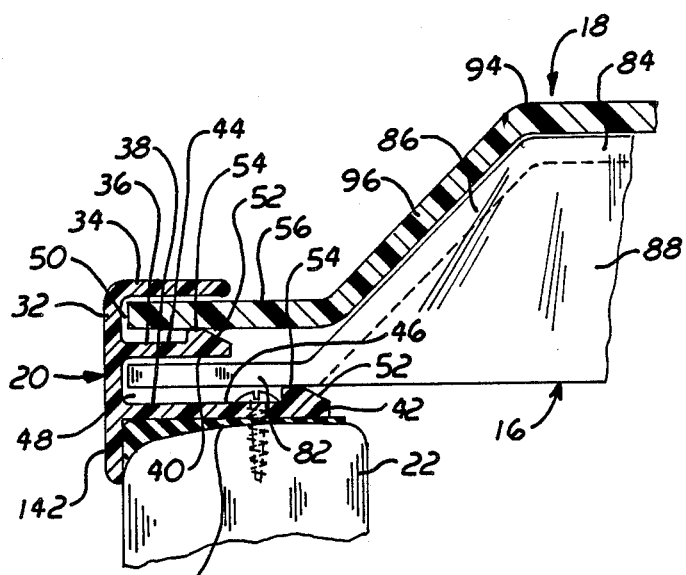
FIG. 3 is a detail end view of the side panel track taken along line 3—3 of FIG. 1.

As best shown in FIG. 3, each side panel track 20 comprises a substantially vertical side track member 32 having an upper, intermediate and lower substantially horizontal side track member indicated as 34, 36 and 38 respectively extending inwardly therefrom. A first and second support element indicated as 40 and 42 respectively extend upwardly from the upper surface 44 of the intermediate substantially horizontal side track member 36 and upper surface 46 of the lower substantially horizontal side track 38 respectively to support the first closure panel 16 and the second closure panel 18. The intermediate and lower substantially horizontal side track member 36 and 38 cooperatively form a first side track channel 48 therebetween, while the upper and intermediate substantially horizontal side track members 34 and 36 cooperatively form a second side track channel 50 therebetween.

The second support element 42 is disposed inwardly in the vertical plane relative to the first support element 40. The inner portion of both the first and second support element 40 and 42 comprises an inclined surface 52 terminating in a flat substantially horizontal support surface 54 to support substantially horizontal opposite longitudinal peripheral edges 56 of the first and second closure panels 16 and 18.

As best shown in FIG. 2, the front and rear panel track 24 and 26 each comprises a substantially vertical track member 56 having an upper, intermediate and lower substantially horizontal track member indicated as 60, 62 and 64 respectively extending inwardly therefrom. A first and second support element indicated as 66 and 68 respectively extend upwardly from the upper surface 70 of the intermediate substantially horizontal track member 62 and upper surface 72 of the lower substantially horizontal track 64 respectively to selectively support the first closure panel 16 and the second closure panel 18. The intermediate and lower substantially horizontal track members 62 and 64 cooperatively form a first track channel 74 therebetween; while the upper and intermediate substantially horizontal track members 60 and 62 cooperatively form a second track channel 76 therebetween.

The second support element 68 is disposed inwardly in the vertical plane relative to the first support element 66. The inner portion of both the first and second support element 66 and 68 comprises an inclined camming surface 78 terminating in a flat substantially horizontal support surface 80 to substantially horizontal lateral support peripheral outer edges 82 of the first and second closure panels 16 and 18.

As best shown in FIGS. 2 and 3, the first closure panel 16 comprises a hollow convex member including a substantially horizontal roof or top member 84 having a pair of side walls each indicated as 86, front wall 88 and rear wall 90 extending downwardly therefrom. The side walls 86 terminate in the substantially horizontal longitudinal peripheral edges 56, while the front wall 88 terminates in the substantially horizontal front lateral peripheral edge 82. A rigid lateral support member 92 is affixed to the rear wall 90.

Figure 4:
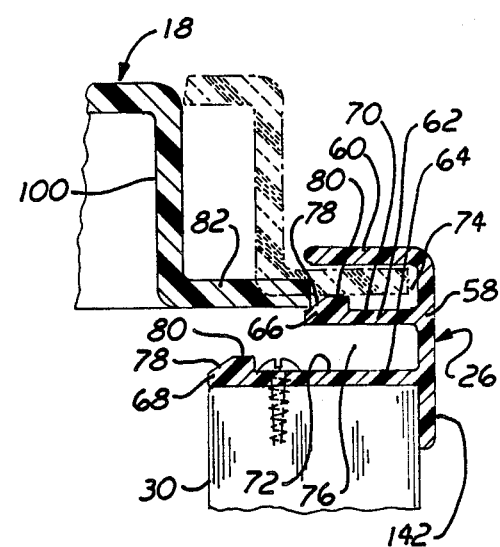
FIG. 4 is a detail end view of the rear panel track.

As best shown in FIGS. 2 through 4, the second closure panel 18 comprises a hollow convex member including a substantially horizontal roof or top member 94 having a pair of side walls each indicated as 96, front lip or skirt 98 and rear wall 100 extending downwardly therefrom. The side walls 96 terminate in the substantially horizontal longitudinal peripheral edges 56, while the rear wall 100 terminates in the substantially horizontal rear lateral peripheral edge 82. The forward edges of the side walls 96 terminate in a side wall lip or skirt indicated as 102. A third or tail light 104 may be mounted on the rear wall 100.

As shown in FIGS. 2 and 7, the pick up truck bed cover 10 further includes a closure panel locking device generally indicated as 106 to selectively lock the first and second closure panels 16 and 18 relative to each other. The closure panel locking device 106 comprises a first and second lock member generally indicated as 108 and 110 respectively. The first lock member 108 comprises a substantially L-shaped lock element 112 affixed to the rear wall 90 of the first closure panel 16. A lock pin 114 and enlarged lock clasp 116 extend outwardly from the substantially L-shaped first lock element 112. The second lock member 110 comprises a key actuated lock mechanism 118 including a keyway 120 having a second lock element 122 including a lock slot 124 formed on one end portion thereof rotatably mounted on the forward portion of side wall 96 of the second closure panel 18.

Figure 5:
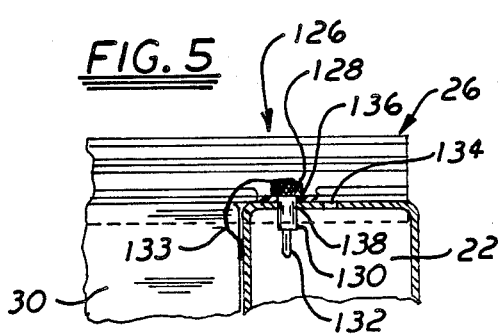
FIG. 5 is a detail view of the securing device in the tailgate securing position.
Figure 6:
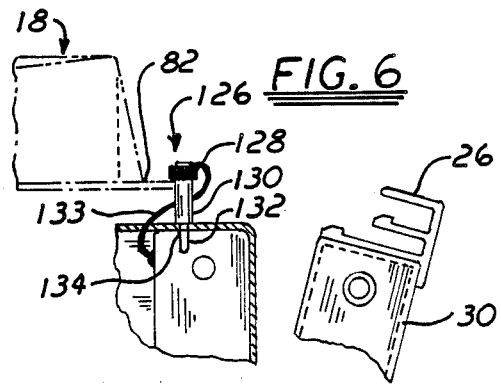
FIG. 6 is a detail view of the securing device in the panel stop position.

As shown in FIGS. 5 and 6, the pick up truck bed cover 10 may also includes a securing device generally indicated as 126 to selectively secure the rear panel track 26 and tailgate 30 to one side wall 22 of the bed 12 of the pick up truck 14 when the first and second closure panels 16 and 18 are in the locked position relative to each other or to limit the reaward movement of the first and second closure panels 16 and 18 when in the unlocked position relative to each other. The securing device 126 comprises an enlarged upper element, intermediate element and lower reduced element of decreasing diameter indicated as 128, 130 and 132 respectively attached the bed 12 of the pick up truck 14 by a flexible cord or chain 133. A reduced panel limit aperture 134 is formed through one side wall 22 to selectively receive the lower reduced element 132 (FIG. 6), while first and second securing apertures indicated as 136 and 138 respectively are formed through the rear panel track 26 and side wall 22 to selectively receive the intermediate element 130.

A shim member 140 may be provided between the side tracks 20 and side walls 22 to accomodate different pickup trucks 14. Further, the lower portion 142 of the side tracks 20 and lower portion 144 of the rear panel track 26 extend below the lower substantially horizontal side track member 38 and lower substantially horizontal track member 64 respectively to stabilize the side tracks 20 and rear panel track 26.

In use, the tailgate 30 is opened to permit the substantially horizontal longitudinal peripheral edges 56 of the first and second closure panels 16 and 18 to be slid into the first and second side track channels 48 and 50 and moved forward along the bed 12 of the pickup truck 14 with the substantially horizontal longitudinal peripheral edge 56 resteing on the respective upper surfaces 54 and the second and first support elements 40 and 42. The first closure panel 16 is moved forward until the substantially horizontal lateral peripheral edge 82 of the front wall 88 is disposed within the first track channel 74 resting on the flat substantially horizontal support surface 80 of the second support element 68.

With the first and second closure panels 16 and 18 in the retracted position (FIG. 1) the substantially horizontal lateral peripheral edge 82 of the second closure panel 16 will engage the intermediate element to limit the rearward movement thereof (FIG. 6).

To secure the tailgate 30 to the bed 12 of the pickup truck 14, the lower reduced and intermediate elements 132 and 130 are placed through the first and second securing apertures 136 and 138. The second closure panel 18 may then be extended as shown in FIG. 2. In this configuration, the substantially horizontal lateral peripheral edge 82 of the rear wall 100 is disposed within the second track channel 76 resting on the flat substantially horizontally support surface 80 of the first support element 66 (FIG. 4). The second lock element 122 is rotated from the first position (FIG. 2) to the second position (FIG. 7) such that the lock slot 124 engages the lock pin 114 between the enlarged lock clasp 116 and substantially L-shaped lock element 112 to lock the first and second closure panels 16 and 18 in the extended position (FIG. 2). The enlarged lock clasp 116 prevents the second lock element 122 from being forcibly disengaged from the lock pin 114.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A pickup truck bed cover to selectively enclose the bed of a pickup truck comprising a first and second closure panel slidably mounted between a pair of substantially parallel side panel tracks affixed to opposite side walls of the bed of the pickup truck, each said substantially parallel side panel tracks includes an intermediate and a lower track member to operatively support opposite longitudinal peripheral edges of said second and first closure panels respectively, a rear panel track affixed to the tailgate of the pickup truck and including an intermediate track member to selectively support a rear lateral peripheral edge of said second closure panel and a closure panel locking device to selectively lock said first and second closure panels relative to each other.

2. The pickup truck bed cover of claim 1 wherein each of said side panel tracks comprises a substantially vertical side track member having an upper, intermediate, and a lower substantially horizontal side track member extending inwardly therefrom, said intermediate and lower substantially horizontal side track members cooperatively form a first side track channel therebetween to receive said opposite longitudinal peripheral edges of said first closure panel, said upper and intermediate substantially horizontal side track members cooperatively form a second track channel therebetween to receive said opposite longitudinal peripheral edges of said second closure.

3. The pickup truck bed cover of claim 2 wherein said rear panel track comprises a substantially vertical track member having an upper and intermediate substantially horizontal track member extending inwardly therefrom, said substantially upper and intermediate horizontal track members cooperatively from a track channel to selectively receive said rear lateral peripheral edge of said second closure panel.

4. The pickup truck bed cover of claim 3 further including a first and second support element extending upwardly from said intermediate and lower substantially horizontal side track members respectively to support said opposite longitudinal peripheral edges of said second and first closure panels respectively and a support element extending upwardly from said intermediate substantially horizontal track member of said rear panel track to selectively support said rear lateral peripheral edge of said second panel closure.

5. The pickup truck bed cover of claim 4 wherein an inner portion of said first support element of said rear panel track comprises an inclined camming surface to direct said second closure panel into said track channel of said rear panel track.

6. The pickup truck bed cover of claim 4 wherein said first closure panel comprises a roof member having a pair of side walls, front wall and rear wall extending downwardly therefrom, said side walls terminating in said longitudinal peripheral edges and said second closure panel comprises a roof member having a pair of side walls, front lip and rear wall extending downwardly therefrom, said side walls terminating in said longitudinal peripheral edges and said rear wall terminating in said rear lateral peripheral edge.

7. The pickup truck bed cover of claim 6 wherein said closure panel locking device comprises a first and second lock member, said first lock member includes a lock pin affixed to said first closure panel having an enlarged lock clasp formed on the outer end thereof and said second lock member includes a second lock element including a lock slot movable between a first and second position attached to said second closure panel such that when said first and second closure panels are extended relative to each other and said second lock element is moved from said first position to siad second position said lock slot engages said lock pin to lock said first and second closure panels relative to each other.

8. The pickup truck bed cover of claim 7 further including a securing device comprising an intermediate element and upper element, a first and second securing aperture are formed through the rear panel track and one side wall of the pickup truck respectively such that when the tailgate is closed, the first and second securing apertures are aligned to receive said intermediate element to secure the tailgate to the sidewall of the pickup truck.

9. The pickup truck bed cover of claim 8 wherein said securing device further includes a lower reduced element and the side wall of the pickup truck further includes a reduced panel limit aperture such that when said second closure panel is moved forward relative to the tailgate said lower reduced element is placed in the reduced panel limit aperture and said rear lateral peripheral edge of said second closure panel will engage said intermediate element to limit the rearward movement of said second closure panel.

10. A pickup truck bed cover to selectively enclose the bed of a pickup truck comprising a first and second closure panel slidably mounted between a pair of substantially parallel side panel tracks affixed to opposite side walls of the bed of the pickup truck, each substantially parallel side panel track includes an intermediate and a lower track member to operatively support opposite longitudinal peripheral edges of said second and first closure panels respectively, a rear panel track affixed to the tailgate of the pickup truck and including an intermediate track member to selectively support a rear lateral peripheral edge of said second closure panel, a front panel track affixed to the forward portion of the bed of the pickup truck including a lower track member to selectively support a front peripheral lateral edge of said first closure panel and a closure panel locking device to selectively lock said first and second closure panels relative to each other.

11. The pickup truck bed cover of claim 10 wherein each of said side panel tracks comprises a substantially vertical side track member having an upper, intermediate and a lower substantially horizontal side track member extending inwardly therefrom, said intermediate and lower substantially horizontal side track members cooperatively form a first side track channel therebetween to receive said opposite longitudinal peripheral edges of said first closure panel, said upper and intermediate substantially horizontal side track members cooperatively form a second track channel therebetween to receive said opposite longitudinal peripheral edges of said second closure panel.

12. The pickup truck bed cover of claim 11 wherein said rear panel track comprises a substantially vertical track member having an upper and intermediate substantially horizontal track member extending inwardly therefrom, said substantially upper and intermediate horizontal track members cooperatively from a track channel to selectively receive said rear lateral peripheral edge of said second closure panel and said front panel track comprises a substantially vertical member having an intermediate and a lower substantially horizontal track member extending inwardly therefrom, said substantially intermediate and lower horizontal track members cooperatively form a track channel to receive said front lateral peripheral edge of said first closure panel.

13. The pickup truck bed cover of claim 12 further including a first and second support element extending upwardly from said intermediate and lower substantially horizontal side track members respectively to support said opposite longitudinal peripheral edges of said second and first closure panels respectively, a support element extending upwardly from said intermediate substantially horizontal track member of said rear panel track to selectively support said rear lateral peripheral edge of said second panel closure and a support element extending upwardly from said lower substantially horizontal track member of said front panel track to support said front lateral peripheral edge of said first panel closure.

14. The pickup truck bed cover of claim 13 wherein an inner portion of said first support element of said rear panel track comprises an inclined camming surface to direct said second closure panel into said track channel of said rear panel track.

15. The pickup truck bed cover of claim 13 wherein said first closure panel comprises a roof member having a pair of side walls, front wall and rear wall extending downwardly therefrom, said side wall terminating in said longitudinal peripheral edges and said front wall terminating in said forward lateral peripheral edge and said second closure panel comprises a roof member having a pair of side walls, front lip and rear wall extending downwardly therefrom, said side walls terminating in said longitudinal peripheral edges and said rear wall terminating in said rear lateral peripheral edge.

16. The pickup truck bed cover of claim 15 wherein said closure panel locking device comprises a first and second lock member, said first lock member includes a lock pin affixed to said first closure panel having an enlarged lock clasp formed on the outer end thereof and said second lock member includes a second lock element including a lock slot movable between a first and second position attached to said second closure panel such that when said first and second closure panels are extended relative to each other and said second lock element is moved from said first position to said second position said lock slot engages said lock pin to lock said first and second closure panels relative to each other.

17. The pickup truck bed cover of claim 16 further including a securing device comprising an intermediate element and upper element, a first and second securing aperture are formed through the rear panel track and one side wall of the pickup truck respectively such that when the tailgate is closed, the first and second securing apertures are aligned to receive said intermediate element to secure the tailgate to the sidewall of the pickup truck.

18. The pickup truck bed cover of claim 17 wherein said securing device further includes a lower reduced element and the side wall of the pickup truck further includes a reduced panel limit aperture such that when said second closure panel is moved forward relative to the tailgate said lower reduced element is placed in the reduced panel limit aperture and said rear lateral peripheral edge of said second closure panel will engage said intermediate element to limit the rearward movement of said second closure panel.

19. The pickup truck bed cover of claim 3 wherein a lower portion of said substantially vertical side track members extend below said lower substantially horizontal side track members to engage the corresponding side wall of the pickup truck and the lower substantially vertical track member extends below said intermediate substantially horizontal track members of said rear panel track to engage an outer surface of the tailgate.

20. The pickup truck bed cover of claim 12 wherein a lower portion of said substantially vertical side track members extend below said lower substantially horizontal side track members to engage the corresponding side wall of the pickup truck and the lower substantially vertical track member extends below said intermediate substantially horizontal track members of said rear panel track to engage an outer surface of the tailgate.

* * * * *